IMAGE US012483652B2

(12) United States Patent
Klaghofer et al.

(10) Patent No.: US 12,483,652 B2
(45) Date of Patent: Nov. 25, 2025

(54) METHOD FOR CONTROLLING A REAL-TIME CONVERSATION AND REAL-TIME COMMUNICATION AND COLLABORATION PLATFORM

(71) Applicant: RINGCENTRAL, INC., Belmont, CA (US)

(72) Inventors: Karl Klaghofer, Munich (DE); Wolfgang Schiffer, Herzogenrath (DE); Michael Rodenbücher, Eschweiler (DE)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 18/422,217

(22) Filed: Jan. 25, 2024

(65) Prior Publication Data

US 2024/0205328 A1 Jun. 20, 2024

Related U.S. Application Data

(63) Continuation of application No. 17/296,359, filed as application No. PCT/EP2018/082739 on Nov. 27, 2018, now Pat. No. 11,924,370.

(51) Int. Cl.
*H04M 3/38* (2006.01)
*G10L 15/22* (2006.01)
(Continued)

(52) U.S. Cl.
CPC ............ *H04M 3/385* (2013.01); *G10L 15/22* (2013.01); *G10L 25/51* (2013.01);
(Continued)

(58) Field of Classification Search
CPC .... H04M 3/385; H04M 3/5166; H04M 3/527; H04M 2201/40; H04M 3/563; G10L 15/22; G10L 25/51; G10L 2015/223
See application file for complete search history.

(56) References Cited

U.S. PATENT DOCUMENTS 8,442,197 B1 5/2013 Mazza et al.
9,224,387 B1 12/2015 Slifka
(Continued)

OTHER PUBLICATIONS

International Search Report for PCT/EP2018/082739, Jul. 25, 2019.
(Continued)

*Primary Examiner* — Akelaw Teshale
(74) *Attorney, Agent, or Firm* — Finnegan, Henderson, Farabow, Garrett & Dunner LLP

(57) ABSTRACT

The present disclosure relates to a method for controlling a real-time communication between at least two participants on a real-time conversation and collaboration platform by means of a digital assistant unit, wherein clients are connected to a conferencing application via a communications network establishing the communication, the method comprising the steps of identifying, from the at least two participants, a first participant as an active speaker in the conversation by using audio signals received from the first participant via a microphone, activating the digital assistant unit for the first participant, if a predetermined event is detected, wherein the audio signals received from the first participant are analyzed so as to identify voice commands therefrom, wherein an Automatic Speech Recognition engine performs a voice recognition procedure for identifying and transcribing the identified voice commands, and wherein the transcribed voice commands are analyzed and executed.

20 Claims, 8 Drawing Sheets

(51) Int. Cl.
*G10L 25/51* (2013.01)
*H04M 3/51* (2006.01)
*H04M 3/527* (2006.01)

(52) U.S. Cl.
CPC ........ *H04M 3/5166* (2013.01); *H04M 3/527* (2013.01); *G10L 2015/223* (2013.01); *H04M 2201/40* (2013.01)

(56) References Cited

U.S. PATENT DOCUMENTS

| | | | |
|---|---|---|---|
| 9,420,227 | B1* | 8/2016 | Shires ................. H04N 7/15 |
| 9,462,102 | B1* | 10/2016 | Gorthi .................. H04M 1/656 |
| 10,083,006 | B1* | 9/2018 | Feuz ................... G10L 25/51 |
| 10,089,067 | B1* | 10/2018 | Abuelsaad ............ G10L 17/22 |
| 10,262,654 | B2* | 4/2019 | Hakkani-Tur ......... G10L 15/22 |
| 10,540,971 | B2* | 1/2020 | Kumar ................ H04L 12/1827 |
| 10,623,563 | B2 | 4/2020 | Dingler et al. | |
| 11,669,683 | B2 | 6/2023 | Shires et al. | |
| 2002/0069069 | A1 | 6/2002 | Kanevsky et al. | |
| 2010/0076760 | A1 | 3/2010 | Kraenzel et al. | |
| 2010/0223389 | A1 | 9/2010 | Ananthanarayanan et al. | |
| 2010/0228546 | A1 | 9/2010 | Dingler et al. | |
| 2012/0253801 | A1* | 10/2012 | Santos-Lang ........... G10L 15/22 704/235 |
| 2015/0003595 | A1* | 1/2015 | Yaghi ................... H04M 3/5175 379/85 |
| 2017/0004178 | A1 | 1/2017 | Ponting et al. | |
| 2017/0092264 | A1* | 3/2017 | Hakkani-Tur .......... G10L 15/16 |
| 2018/0061402 | A1 | 3/2018 | Devaraj et al. | |
| 2018/0063326 | A1* | 3/2018 | Tichauer ............. H04M 3/4936 |
| 2018/0098030 | A1* | 4/2018 | Morabia ............... H04L 65/403 |
| 2018/0249122 | A1 | 8/2018 | Reshef et al. | |
| 2018/0260680 | A1* | 9/2018 | Finkelstein ............... G06N 5/04 |
| 2018/0267774 | A1* | 9/2018 | Williams ................ G06F 3/041 |
| 2018/0316893 | A1* | 11/2018 | Rosenberg ............. H04N 7/152 |
| 2018/0366118 | A1* | 12/2018 | Lovitt ..................... G10L 15/26 |
| 2019/0189117 | A1* | 6/2019 | Kumar ................ G06F 16/3329 |
| 2019/0260757 | A1* | 8/2019 | Ernesti ................. H04W 12/63 |
| 2019/0341050 | A1* | 11/2019 | Diamant .............. G06V 40/172 |
| 2019/0341055 | A1* | 11/2019 | Krupka ..................... G10L 17/08 |
| 2019/0378502 | A1 | 12/2019 | Bostick et al. | |
| 2020/0258506 | A1 | 8/2020 | Slifka | |
| 2020/0279074 | A1 | 9/2020 | Shires et al. | |

OTHER PUBLICATIONS

Written Opinion of the International Searching Authority for PCT/EP2018/082739, Jul. 25, 2019.

* cited by examiner

METHOD FOR CONTROLLING A REAL-TIME CONVERSATION AND REAL-TIME COMMUNICATION AND COLLABORATION PLATFORM

The present application is a continuation of U.S. application Ser. No. 17/296,359, filed May 24, 2021, which is the U.S. national stage application of International Patent Application No. PCT/EP2018/082739, filed on Nov. 27, 2018, the contents of all of which are incorporated herein by reference in their entirety.

The present invention relates a method for controlling a real-time conversation and a real-time communication and collaboration platform.

In prior art, speech- or voice-based application control is increasingly implemented as well as Artificial Intelligence (AI).

For example, there are various interactive voice control applications known for simply controlling devices or applications by means of speech. For example, digital assistants are known for controlling electrical appliances or devices, like a radio or a TV set in a living room of a house. However, the digital assistants known in prior art are only applicable for more or less private services or appliances, as mentioned above, in a private house.

In the business sector or in enterprise environments, the known digital assistants cannot be used due to various reasons. For example, in a large office in which many people are working, it may be problematic to employ a virtual assistant designed for private purposes, as for example, to be used in a private house. Namely, a large number of people (in the following referred to as "user" or "users" or also "participant" or "participants") may be working in the office in one room, wherein every user wears a headset and is connected to a communication and collaboration system of the company (for example, Circuit provided by Unify or OSC UC). In such an environment, a digital assistant speech box, like for example "Alexa", cannot be placed on every user's desk. Also, a central arrangement of only one digital assistant speech box, like "Alexa", would not be suitable, since there are many users all speaking at the same time, so that the digital assistant would not be able to verify any commands to be executed.

Therefore, it is an object of the present invention to provide a method for controlling a real-time conversation and a corresponding real-time communication and collaboration platform in which a digital assistant is able to execute commands provided by a user in a business environment.

This object is solved according to the present invention by a method for controlling a real-time conversation having the features according to claim 1 and a real-time communication and collaboration platform having the features according to claim 9. Preferred embodiments of the invention are defined in the respective dependent claims.

Accordingly, a method for controlling a real-time communication between at least two participants on a real-time conversation and collaboration platform by means of a digital assistant is provided, wherein clients are connected to a conferencing application via a communications network establishing the communication, the method comprising the steps of identifying, from the at least two participants, a first participant as an active speaker in the conversation by using audio signals received from the first participant via a microphone, activating the digital assistant for the first participant, if a predetermined event is detected, wherein the audio signals received from the first participant are analyzed so as to identify voice commands therefrom, wherein an Automatic Speech Recognition ASR unit performs a voice recognition procedure for identifying and transcribing the identified voice commands, and wherein the transcribed voice commands are analyzed and executed.

Preferably, the real-time communication is a WebRTC-based communication, performed on a WebRTC-based communication and collaboration platform. However, in this context, both WebRTC and SIP can be equally used.

Consequently, a client can be a Web Browser (in a WebRTC scenario) or a specific softphone/conferencing client (in a SIP scenario).

According to a preferred embodiment, the predetermined event is receiving an input for activating the digital assistant.

According to another preferred embodiment, the predetermined event is the receipt of log-in data from the first participant.

Preferably, the method comprises a step of verifying whether the first participant is authorized to use the digital assistant.

According to still a further preferred embodiment, the predetermined event is the verification of the first participant's authorization.

Preferably, the predetermined event is the detection of a keyword from the audio signals received from the first participant.

It is also advantageous, if the predetermined event is the identification of the matching of an audio sample from the audio signals received from the first participant with at least one pre-recorded voice sample.

If the first participant is verified to be authorized to use the digital assistant, the method may further comprise a step establishing an additional audio channel from the first participant to the digital assistant, and routing the audio signals received from the first participant to the ASR unit via the additional audio channel.

Moreover, according to the present invention, a real-time communication and collaboration platform is provided, which is configured to carry out the method for controlling a real-time conversation, wherein the communication and collaboration platform comprises a first application for processing audio and/or video signals received from at least two participants and for enabling a real-time conversation between the at least two participants over a communications network, and a second application for providing a digital assistant for at least one of the at least two participants.

According to a preferred embodiment, the digital assistant comprises an Automatic Speech Recognition ASR unit, a text-to-speech engine, a Natural Language Understanding NLU unit, a media server, and a virtual Artificial Intelligence AI endpoint, in particular, a digital assistant bot.

According to another preferred embodiment, the digital assistant further comprises an Active Speaker Notification ASN unit, and an authentication and authorization unit.

Preferably, the communication and collaboration platform comprises an interface to the digital assistant bot.

The method and the communication and collaboration platform according to the present invention provide a scalable approach, using a set of central components that together form a Digital Assistant (DA) that acts for the controlling user, based on speech control requests from the controlling user. Namely, the user controlling the DA may provide commands to the DA which then is in charge of these commands being executed.

With respect to the usage of a DA within a real-time conference, it describes solutions for the following problems: In a real-time conference with a plurality of participants, possibly even including guest participants, the usage of the DA should be limited to authorized persons only, in order to prevent misapplication or unwanted usage. In a real-time conference, the operation of a DA may be impaired from participants located in a noisy environment or by the participants themselves, all talking at the same time. In this regard, the present invention enables an increase in audio quality by using an additional audio channel between an identified and authorized person and the DA, in order to improve the speech recognition.

The invention provides an especially beneficial solution for voice controlled enterprise DA applications in general, but also in regard to the utilization of a voice controlled enterprise DA in a real-time conference.

Namely, according to the present invention, a solution for involving the DA into a 1-2-1 call (with only two parties participating) or into a real-time conference with more than two participants is provided, according to which the quality of the speech recognition between the authorized user and the DA is also improved.

In contrast to known DAs like Amazon Echo Alexa, with the Alexa speech box being located on a consumer's living room table, the method and communication and collaboration system according to the present invention are suitable for scalable enterprises communication systems, leveraging the communication system's components such as media servers.

Preferably, a dedicated speech channel between the user and his/her DA (media server) may be used, using existing voice channel establishment procedures (e.g. SOP offer/answer) of the communication and collaboration system. The dedicated speech channel to the DA application (running on the media server) allows for decoupling of the DA speech control channel from the other voice channels used for the regular 2— party or multiple party conference scenarios and allows for using the feature in any call state.

Preferably, the bot part of the DA unit registers with the communication system as virtual first user A' (there also may be multiple virtual users for other users or participants) and monitors the first user A. Thus, it has the full call/conversation control context of the first user A. For example, if the first user A instructs his/her DA to add user D to a "current" 3-party conference (with users or participants A, B, C), the DA bot (virtual assistant) is fully aware about which "current conference" user A is talking about (conference ID, participants, media types, etc.).

The method according to the present invention and the corresponding communication and collaboration platform contribute to the field of Artificial Intelligence (AI)/Machine Intelligence (MI), bots, speech recognition, Natural Speech Language processing and understanding, all applied in a networked manner to communication and collaboration systems.

Further, the voice speech recognition channel DA is a resource assigned by the communication system. This allows for using regular call/conversation establishment procedures (e.g. JavaScript Object Notation JSON messages with Session Description Protocol SOP Offer/Answer procedures, or SIP/SOP) in the same way as channels would be established for regular audio, video sessions.

Further, preferably, a dedicated media server may be used in order to separate the media server resource for voice DA control and other media server usages such as for regular voice and/or video conferences. Also, the voice channel DA may be always on or may be established on-demand. Namely, the voice channel to the DA may be established by a manual trigger. The trigger for an on-demand voice DA channel establishment may accomplished by a user pressing a DA button on his/her client.

Preferably, the client microphone (for example, in a headset) gets connected to the voice DA channel as long as the user holds the DA button pressed. This in analogy to previously known chief/secretary telephone sets. Alternative embodiments may use explicit start/stop DA channel UI button clicks. Still further embodiments may activate the DA voice channel using local voice control.

The invention and embodiments thereof will be described below in further detail in connection with the drawing.

FIG. 1A and FIG. 1B respectively show an architecture for a communication and collaboration platform for performing real-time communication between three parties according to an embodiment.

Figure 1A:
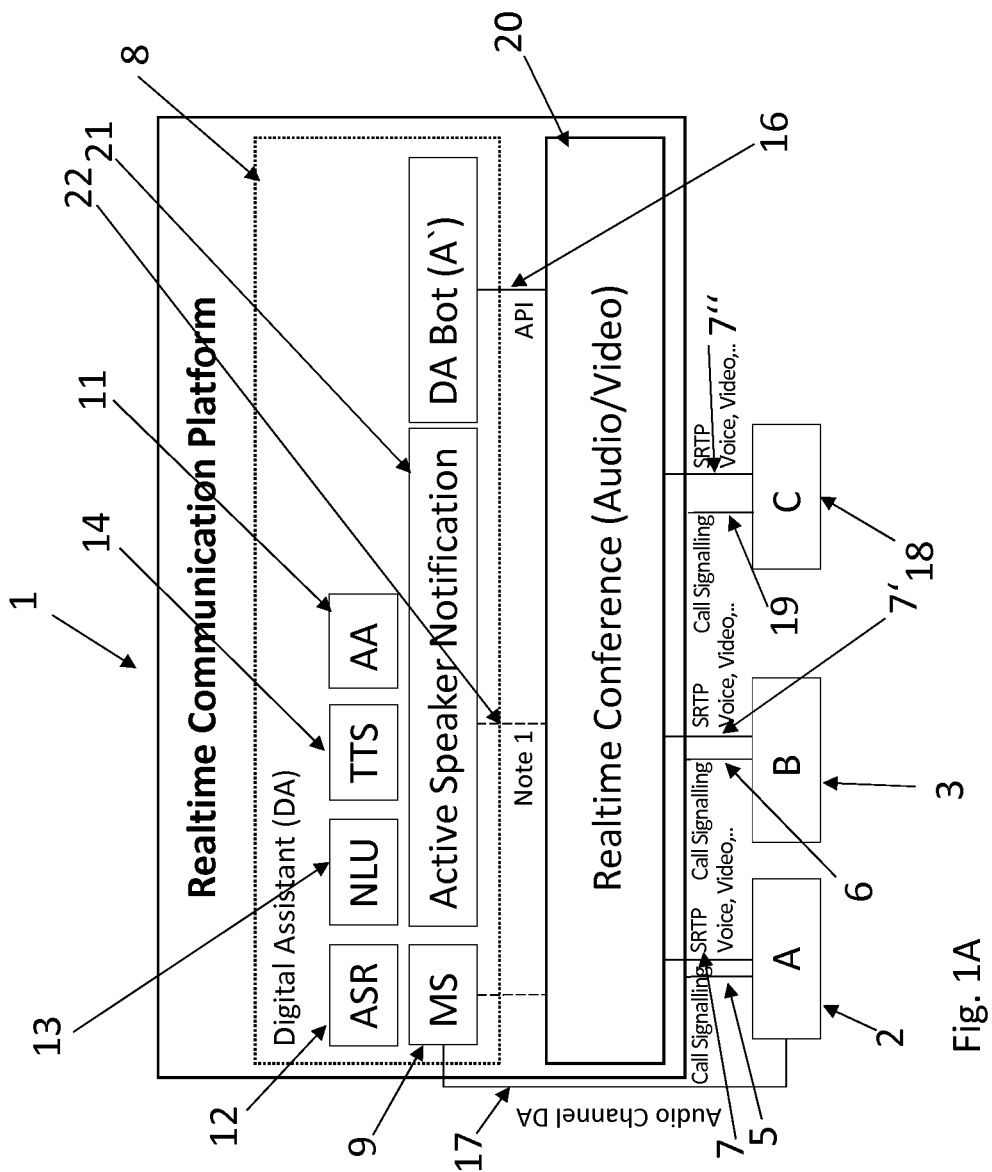
Figure 1B:
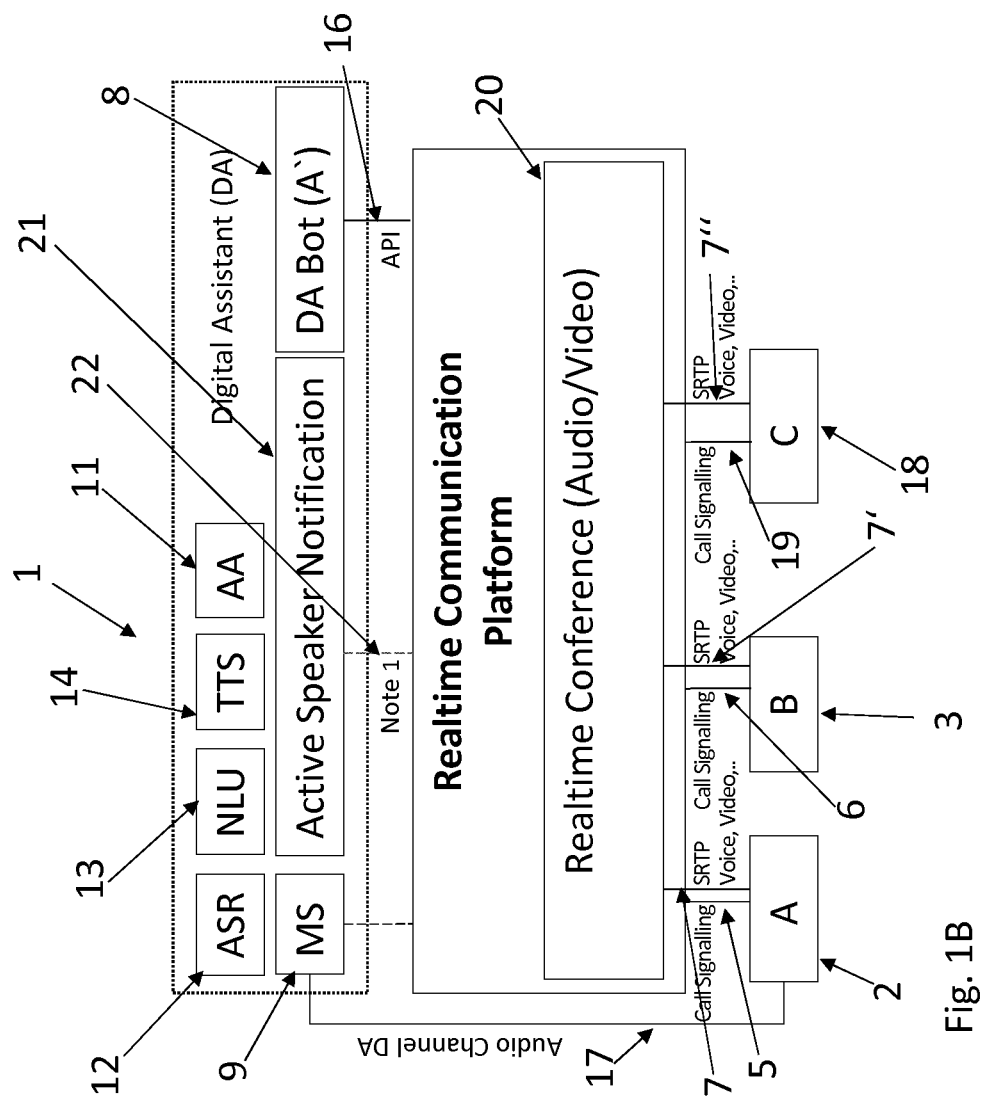

FIG. 1A and FIG. 1B respectively show a real-time communication and collaboration platform 1 for performing real-time communication according to an embodiment of the invention, wherein both embodiments comprise the same components but simply differ with respect to the illustration of the platform's architecture. The real-time communication and collaboration platform 1 may be, for example, a WebRTC-based communication platform. This embodiment concerns a typical scenario of a real-time conference with multiple participants, where only a group of authorized persons or participants should be able to access the DA. In the following embodiments described below, the authorized participant or user is exemplary the first user A at the first client 2. Further, it is noted that this embodiment can also be transferred to a 1-2-1 call as well. As shown here, however, three clients 2, 3 are involved, namely, a first client which is used by a first user or first participant A, a second client 3 which is used by a second user or second participant B, and a third client 18 which is used by a third user C. All clients 2, 3, 18 are equipped with respective microphones, for example, microphones in headsets (not shown here). Further, all clients 2, 3, 18 are connected to the communication and collaboration platform 1 via respective signaling channels, namely, the first client 2 via a first call signaling channel 5, the second client 3 via a second call signaling channel 6, and the third client 18 via a third call signaling channel 23. Further, respective communication channels 7, 7', 7" are provided so as to connect the first, second, and third clients 2, 3, 18 to a server 20 of the communication and collaboration platform 1. The server 20 may be a regular medial or conference server suitable and adapted for real-time communication RTC conferencing. The first, second, and third clients 2, 3, 18 communicate via the communication lines 7, 7', 7", for example, using the Secure Real-time Transport Protocol SRTP for transmission of voice, video, data, etc.

Further, a digital assistant DA unit 8 is provided with a media server 9 on which a digital assistant application is running. The DA unit 8 comprises an Automatic Speech Recognition ASR engine 12, an authentication and authorization AA module 11, a Natural Language Understanding NLU engine 13, a Text to Speech Transcription TTS module 14, an Active Speaker Notification ASN module 21, and a digital assistant DA bot 15, which is indicated with "A'", so as to indicate that it is currently controlled by commands received via the first client 2 from the first user "A", as will be described in further detail below. The DA bot 15 is connected to the media server 20 via an interface 16.

The Active Speaker Notification ASN module 21, here, uses a feature of the underlying real-time communication and collaboration platform 1. Concretely, the real-time communication and collaboration platform 1 issues events in case the speaker in a real-time conference changes, as will be described in further detail below. The conference media server 20 sends media packets to the ASN module 21 via a notification channel "note 1", indicated by reference numeral 22.

Please note that the above mentioned configuration applies for both embodiments, the one illustrated in FIG. 1A and the one illustrated in FIG. 1B. The difference between these two figures is only that in FIG. 1A, the DA unit 8 is integrated into the communication and collaboration platform 1, whereas in FIG. 1B, it is a separate component.

For this embodiment, there are two scenarios conceivable, described in the following.

In the first scenario (1), the DA unit 8 is active without any further trigger. The DA unit 8, in particular, the DA bot 15 is part of the conference performed on the communication and collaboration platform 1. In case the active speaker (namely, one of the participants who is currently speaking) changes, as indicated by an event from the ASN module 21, the DA business logic verifies, if the currently speaking participant is authorized to access the DA unit 8 by using the information provided by the ASN module 21. In case, it is verified that the speaking participant is authorized, the ASR engine 12 subsequently starts transcribing the following utterances. The transcription is passed on to the NLU engine 13, which in turn analyzes the transcription in order to identify the intention of the command given to the DA unit 8. If a command is recognized, it is executed and no specific keywords are needed to trigger the DA unit 8.

For the authorized user/participant or users/participants, the following exemplary commands may be given and executed. The following list, as already mentioned, is only exemplary, but is applicable to all embodiments outlined in the following. Also, other words, or phrases, or commands or the like could be used just as well. The users or participants A, B . . . X (as long as he/she is authorized) may use his natural language for providing instructions or commands to the DA unit 8, in particular, to be executed by the DA bot 15:

1 add user "D" to existing conference with users (clients) "A", "B", "C"
    add user "C" to existing 2-party call/conversation with users (clients) "A", "B"
    create a new call with user (client) "B"
    place connected user (client) "B" on hold and connect me to user (client) "X" for a side talk
    send a file/document/picture to the users in the conference/conversation
    start recording the conference/conversation
    create meeting notes of the current conversation
    start video
    write a text message to user "X" that he may want to join the conference jour fixe
    provide me with statistics, analytics of my communication behavior from last week
    create action items for a participant
    add/remove a user/participant
    call/disconnect a user/participant
    call all users/participants
    terminate the conference
    send out the agenda of the conference to all users/participants
    send out the collected action items of the conference to all users/participants or to the affected users/participants only
    etc.

In the second scenario (2), the DA unit 8 again is part of the conference. The utterances in the conversation are analyzed by means of the ASR engine 12. If a specific keyword is recognized, the DA business logic verifies, if the currently speaking user/participant is authorized to access the DA unit 8 by using the information provided by the ASN module 21. In case the speaking participant is authorized, the ASR engine 12 subsequently starts transcribing the following utterances. The transcription is passed on to the NLU engine 13, which analyzes the transcription to identify the intention of the command given to the DA unit 8. In a next step, the commands are executed. For example, a command may be to post a document or to add another participant to the conference, as already outlined above, which is then executed in the conference server 20 of the communication and collaboration platform 1.

Figure 2:
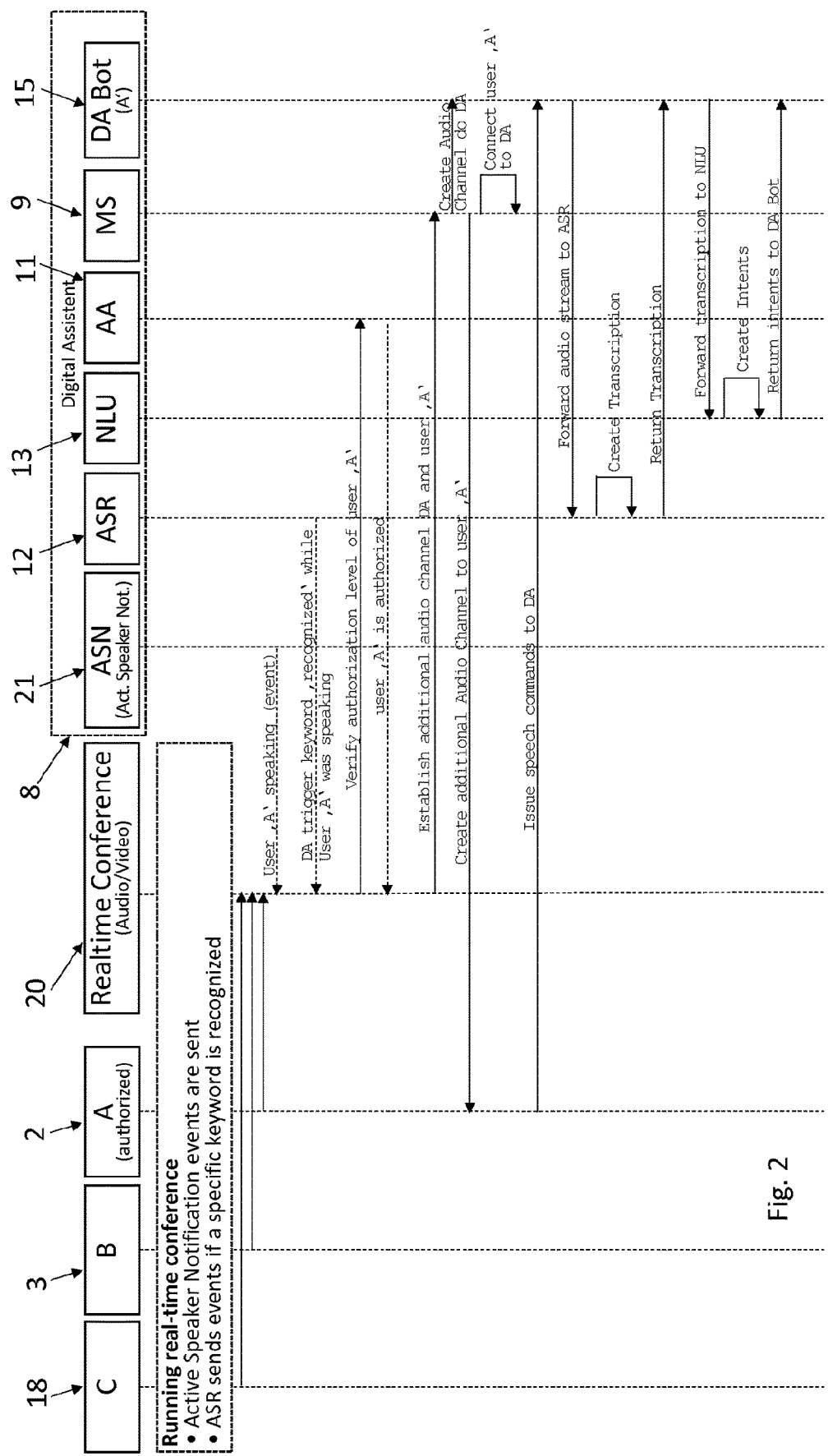
FIG. 2 shows a sequence diagram for a communication and collaboration platform 1 according to the embodiment illustrated in FIG. 1.

FIG. 2 shows a sequence diagram for a communication and collaboration platform 1 according to FIG. 1, which specifically applies to the second scenario (2) described above, namely, the scenario which uses Active Speaker Notification, wherein the ASN sends events, and according to which the DA unit 8 is triggered by a specific keyword. Namely, in this embodiment, the ASR engine 12 sends events, if a specific keyword is recognized. Here, in the running real-time conference, there are three clients 2, 3, 18 involved, wherein the first client 2 is used by a first participant A who is authorized to access the DA unit 8 so as to provide commands for controlling the conversation. The ASN module 21, during the ongoing conference, determines that user or participant A is speaking and sends an active speaker notification event via the notification channel 22 (see FIG. 1A). Then, if a keyword for triggering the DA unit 8 or its DA bot 15 is detected, then the ASR engine 12 sends a notification to the real-time conference server 20 of the communication and collaboration platform 1 that a DA trigger keyword has been recognized while the first user or participant A was speaking. Then, it is verified whether the first user or participant A in fact is authorized to provide commands to the DA bot 15 by sending a corresponding instruction from the conference server 20 to the AA module 11 of the DA unit 8. The AA module 11 verifies if the first user or participant A is authorized and if positive, then sends a notification to the conference server 20 that user A is authorized. Upon this notification, the conference server 20 establishes an additional audio channel DA 17 (see FIG. 1A, FIG. 1B) to the media server 9 of the DA unit 8. As already mentioned above, this servers amongst others, for improving the audio quality and therefore, directly the recognition results. At the same time, background noise from other participants or users or other users or participants all possibly speaking simultaneously, is avoided by using this separate channel.

Subsequently, an audio channel is created within the DA unit 8 from the DA media server 9 to the DA bot 15 so as to connect the authorized user A with the DA bot 15. Once connected that way, the first user or participant A may issue speech commands (audio signals) via the additional audio channel DA 17 to the DA bot 15. The DA bot 15 forwards the received audio signals or speech commands to the ASR engine 12 which creates a transcription of the speech commands and returns the transcribed speech commands to the DA bot 15. The thus transcribed speech command/-s are then forwarded by the DA bot 15 to the NLU engine 13 which analyzes the transcription to identify the intention of the command given to the DA bot 15 and creates so-called intents from the transcribed speech command/-s. The intents are returned to the DA bot 15. If a command has been recognized, it is then executed. After the speech input has been processed as outlined above, the audio channel DA 17 between the first user or participant A and the media server 9 of the DA unit 8 is terminated. Alternatively, the additional audio channel 17 may be terminated after a predetermined timeout.

Figure 3:
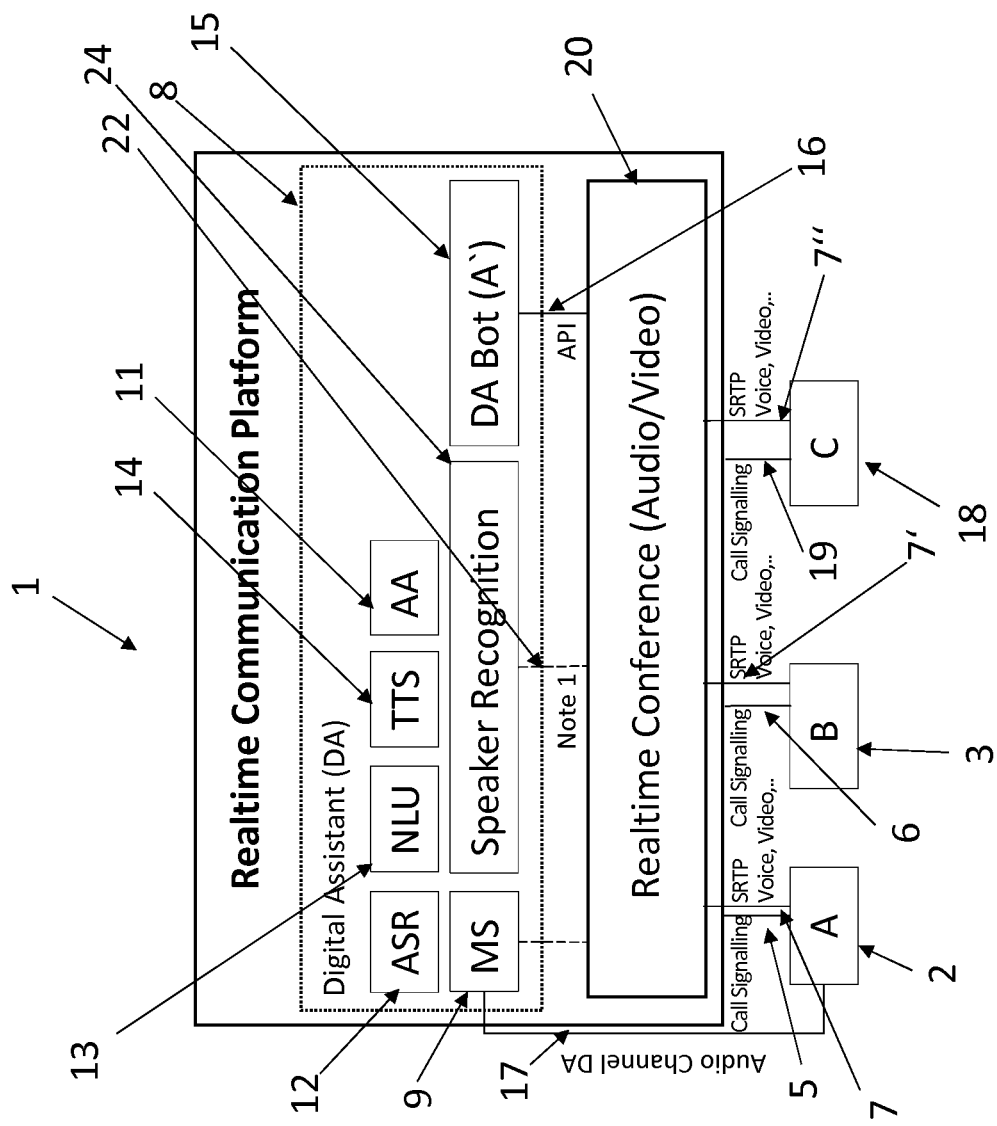
FIG. 3 shows another communication and collaboration platform according to a further embodiment.

FIG. 3 shows another communication and collaboration platform 1 according to a further embodiment, wherein speaker identification is performed by means of speaker recognition, using, for example, an audio sample and DA unit 8 and its DA bot 15, respectively, is triggered by a specific keyword.

Again, a typical scenario of a real-time conference with multiple participants (for example, users A, B, C) is described, where only a group of authorized persons should be able to access the DA unit 8. This embodiment specifically applies to a situation, where the authorized user participates in a conference with other participants via only one audio device, so that the ASN module 21 cannot be used.

In this scenario, another feature of the underlying real-time communication platform 1 is utilized. Concretely, the real-time communication platform 1 offers a feature usually known as 'Speaker Recognition'. Such a feature is normally part of the deployed ASR engine 12, but separate solutions are also available and may be implemented in this embodiment as well. Usually these solutions compare a given audio sample with some pre-recorded voice samples of the users.

Again, for such a situation, two different sub-scenarios are described, which are different in the way the DA unit 8 or the DA application running on the media server 9 of the DA unit 8 is triggered.

In a first scenario (1'), in which the DA unit 8 is active without any further trigger, again, the DA unit 8 is part of the ongoing conference, and the utterances are analyzed by means of the ASR engine 12. Concretely, the audio stream is continuously analyzed by means of the ASR engine 12 and audio samples are recorded. These audio samples are provided to Speaker Recognition SR engine 24. In case the speaker can be recognized, the identified speaker (for example user/participant A) is provided to the conference server 20 of the communication and collaboration platform 1, which verifies if the identified user is authorized.

In case the identified user is determined to be authorized, the ASR engine 12 starts transcribing the following utterances. The transcription is passed to a Natural Language Understanding (NLU) engine or module 13. The NLU engine 13 analyzes the transcription to identify the intention of the command given to the DA bot 15. If a command is recognized, it is executed. However, as mentioned above, in this scenario, no specified keywords are needed to trigger the DA bot 15.

In a second scenario (2'), the DA unit 8 and its DA bot 15, respectively, are triggered via a specific keyword. Like in scenario (1'), the DA unit 8 again is part of the conference. The utterances in the conversation are continuously analyzed by means of an Automatic Speech Recognition (ASR) engine 12. If a specific keyword is recognized, by the ASR engine 12, the speaker identification is provided to the conference server 20 of the communication and collaboration platform 1 which provides an audio sample, for example, as a voice fingerprint, to the SR engine 24. Then, the AA module 11 verifies whether the thus identified user is an authorized user. In case, the result is positive, the ASR engine 12 starts transcribing the following utterances. The transcription is passed to a Natural Language Understanding (NLU) engine 13. The NLU engine 13 analyzes the transcription to identify the intention of the command given to the DA bot 15, as already described above with respect to FIG. 2. In a next step the commands are executed.

In the scenarios (1') and (2') described above, speech recognition is used so as to identify authorized persons. Please note that these embodiments may also be implemented with a NLU module 13 that is capable of identifying authorized persons in a real-time conference by means of their voice print. These embodiments require that the voice channel (for example, in case of user A, the DA voice recognition channel 17) to the DA unit 8 is always active during the real-time conference in order to be triggered by specific keywords.

If a keyword is recognized by the DA unit 8 and its ASR engine 12, respectively, and the keyword was spoken by an authorized user (identified via Speech Recognition engine 24), a separate audio channel (for example channel 17) from the speaker to the DA unit 8 is established, as already described above. This improves the audio quality and the therefore directly the recognition results, and also eliminates background noise from other participants.

Figure 4:
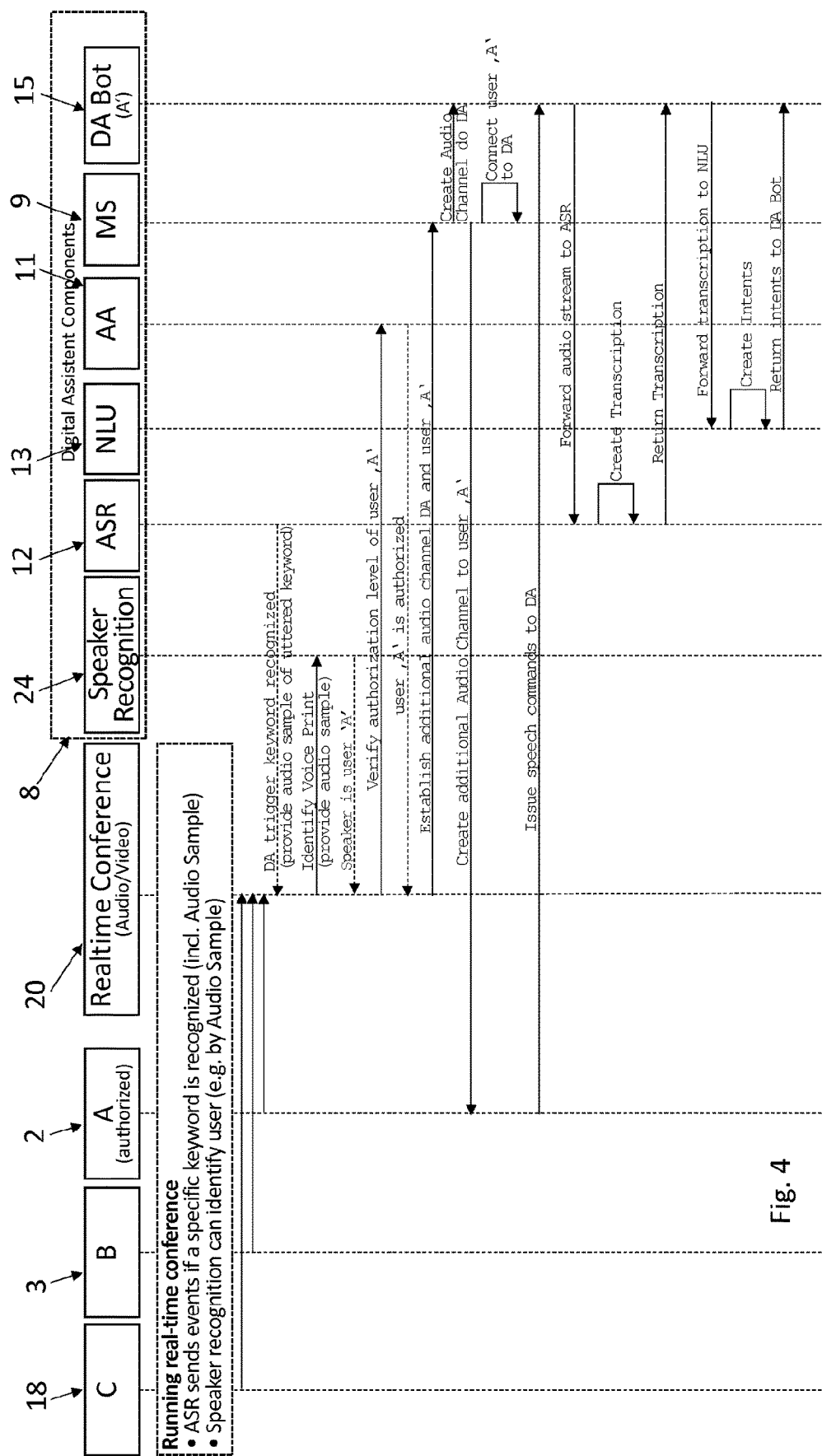
FIG. 4 shows a sequence diagram for a communication and collaboration platform according to the embodiment illustrated in FIG. 3.

FIG. 4 shows a sequence diagram for a communication and collaboration platform 1 according to FIG. 3, which specifically applies to the second scenario (2') described above, namely, the scenario which uses Speaker Identification by means of Speaker Recognition (audio sample), and the DA unit 8 and its DA bot 15, respectively, is triggered by a specific keyword.

Again, also in this embodiment, the ASR engine 12 sends events, if a specific keyword is recognized. Here, in the running real-time conference, there are three clients 2, 3, 18 involved, wherein the first client 2 is used by a first participant A who is authorized to access the DA unit 8 so as to provide commands for controlling the conversation.

The ASN module 21, during the ongoing conference, determines that user or participant A is speaking and sends an active speaker notification event via the notification channel 22 (see FIG. 1A). Then, if a keyword for triggering the DA unit 8 or its DA bot 15 is detected, the ASR engine 12 sends a notification to the real-time conference server 20 of the communication and collaboration platform 1 that a DA trigger keyword has been recognized while the first user or participant A was speaking, whereby the ASR engine 12 sends an audio sample of the keyword spoken by the first user A to the conference server 20. The latter then sends an instruction to the SR engine 24 to identify an audio sample, for example, a voice fingerprint of the first user A, to the SR engine 25 for identifying that the keyword has been spoken from user A. If the result is positive, then, a corresponding notification is sent from the SR engine 24 to the conference server 20 that the speaker (currently speaking, and having said the keyword) is user A. The AA module 11 then receives an instruction from the conference server 20 so as to verify the authorization of user A, and if this result is positive, the AA module 11 sends back a corresponding notification to the conference server 20, which instructs to establish the additional audio channel DA 17 between the authorized user A and the media server 9 of the DA unit 8.

As already mentioned above, this serves amongst others, for improving the audio quality and therefore, directly the recognition results. At the same time, background noise from other participants or users or other users or participants all possibly speaking simultaneously, is avoided by using this separate channel.

Subsequently, an audio channel is created within the DA unit 8 from the DA media server 9 to the DA bot 15 so as to connect the authorized user A with the DA bot 15. Once connected that way, the first user or participant A may issue speech commands (audio signals) via the additional audio channel DA 17 to the DA bot 15. The DA bot 15 forwards the received audio signals or speech commands to the ASR engine 12 which creates a transcription of the speech commands and returns the transcribed speech commands to the DA bot 15. The thus transcribed speech command/-s are then forwarded by the DA bot 15 to the NLU engine 13 which analyzes the transcription to identify the intention of the command given to the DA bot 15 and creates so-called intents from the transcribed speech command/-s. The intents are returned to the DA bot 15. If a command has been recognized, it is then executed. After the speech input has been processed as outlined above, the audio channel DA 17 between the first user or participant A and the media server 9 of the DA unit 8 is terminated. Alternatively, the additional audio channel 17 may be terminated after a predetermined timeout.

Figure 5:
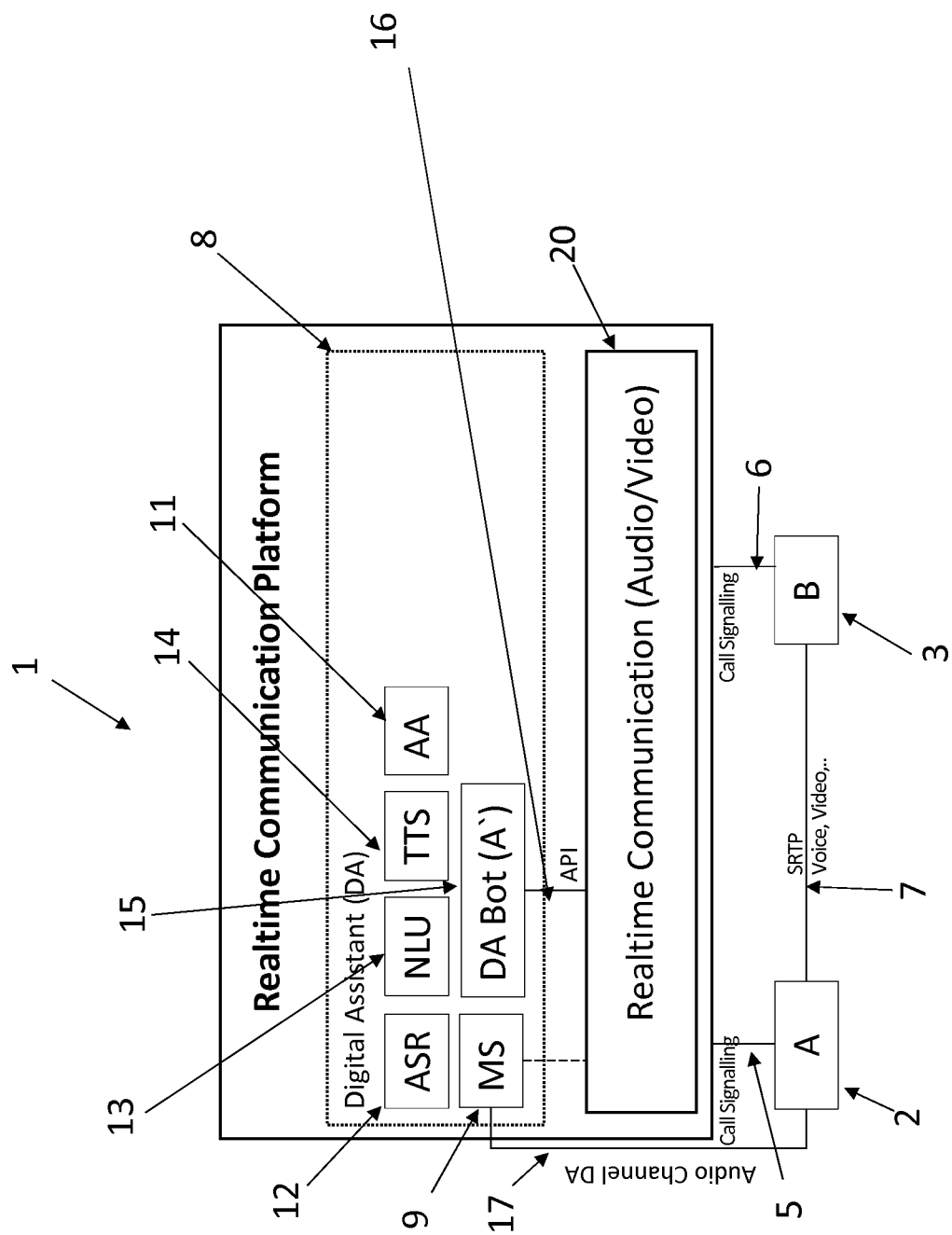
FIG. 5 shows another communication and collaboration platform according to still a further embodiment.

FIG. 5 shows another communication and collaboration platform 1 according to still a further embodiment, which uses indirect speaker identification, and wherein the DA unit 8 and its DA bot 15, respectively, is triggered via a functionality in a client application. As can be seen, the scenario illustrated concerns a 1-2-1 call scenario between a first client 2 for a first user or participant A and a second client 3 for a second user or participant B.

Both users A, B are connected with their clients 2, 3 via respective call signaling channels 5, 6 to the conference server 20 of the communication and collaboration platform 1. Further the first and second clients 2, 3 are connected to each other via a communication channel 7. The DA unit 8 which is integrated into the communication and collaboration platform 1, here, comprises a media server 9 connected to the conference server 20 of the communication and collaboration platform 1. Further, the DA unit 8 comprises an ASR engine 12, an NLU module 13, a TTS module 14, an AA module 11, and a DA bot (here, created for the authorized first user A, indicated by A') 15 as a virtual artificial intelligence AI endpoint. The DA bot 15 is connected to the conference server 20 of the communication and collaboration platform 1 via an interface 16. As can be seen, an additional audio channel DA 17 is created between the authorized user A, determined to be authorized as outlined above, and the DA unit 8 and its media server 9, respectively.

In this scenario, as mentioned above, which is also applicable to the scenario described with respect to FIG. 6 described below, the identification of the user is indirectly done when the users make use of a client application to log in into the conferencing application running on the conferencing server 20. In case the logged in user is authorized, the user interface of the client application provides means to trigger the DA unit 8 and its DA bot 15, respectively.

In case the DA bot 15 is triggered via the clients' user interface, the ASR engine 12 starts transcribing the following utterances. The transcription is passed to the NLU module 13, which analyzes the transcription to identify the intention of the command given to the DA bot 15. In a next step, the commands are executed.

Alternatively, the functionality described above could be offered to every user of the client application, if there is no need to restrict the access to the DA unit 8 to specific users.

Figure 6:
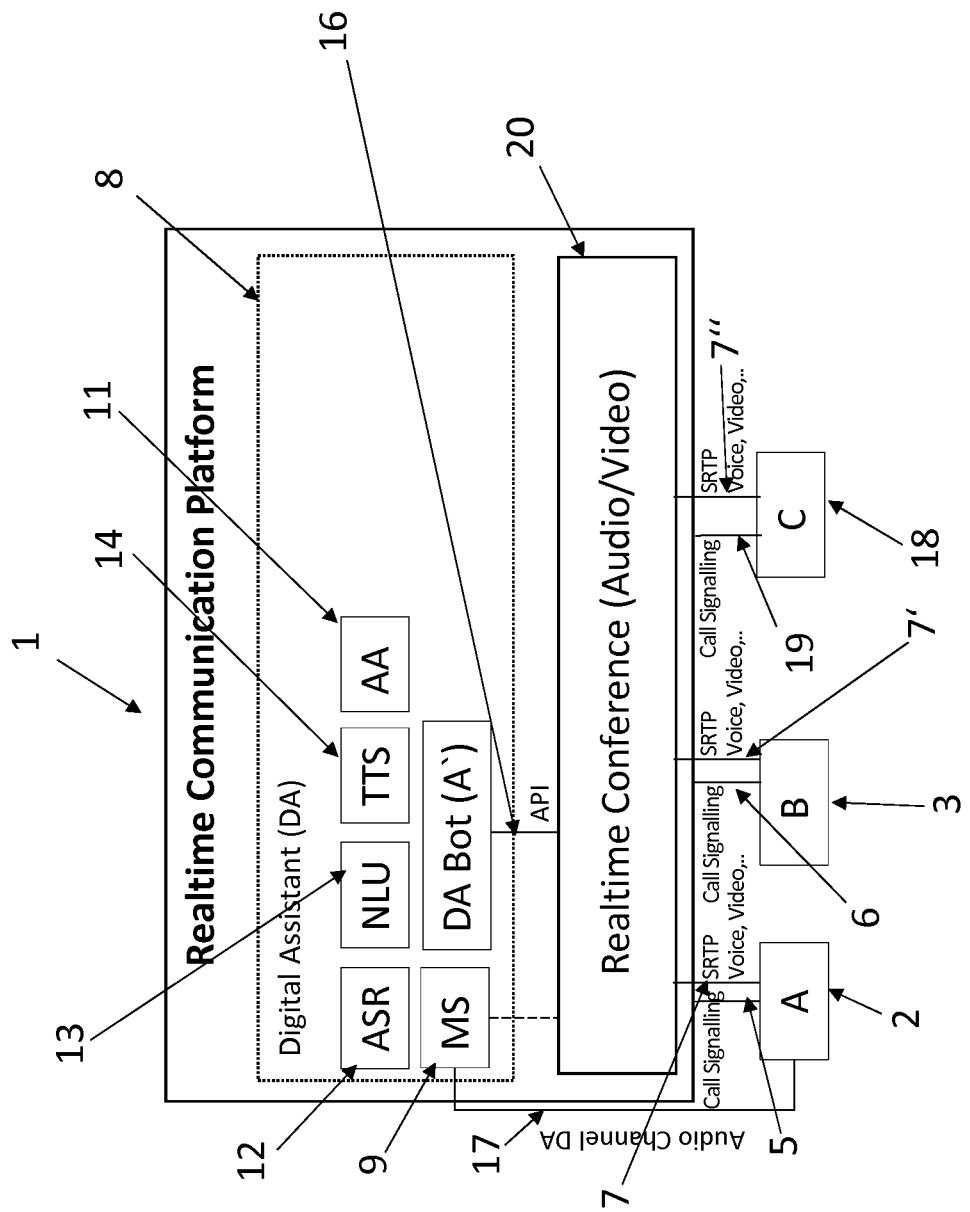
FIG. 6 shows another communication and collaboration platform according to still a further embodiment.

FIG. 6 shows another communication and collaboration platform 1 according to still a further embodiment, which uses indirect speaker identification, and wherein the DA unit 8 and its DA bot 15, respectively, is triggered via a functionality in a client application. In contrast to FIG. 5 in which a 1-2-1 call scenario has been illustrated, here, a real-time conference between a first client 2 used by a first user or participant A, a second client 3 used by a second user or participant B, and a third client 18 used by a third user C is concerned.

Here, all three clients 2, 3, 18 are connected to the conference server 20 of the communication and collaboration platform 1 by respective communication channels 7, 7', 7". Further, the clients 2, 3, 18 are connected to the communication and collaboration platform 1 by respective call signaling channels 5, 6, 19.

The DA unit 8 which is integrated into the communication and collaboration platform 1, again comprises a media server 9 connected to the conference server 20 of the communication and collaboration platform 1. Further, the DA unit 8 comprises an ASR engine 12, an NLU module 13, a TTS module 14, an AA module 11, and a DA bot (here, created for the authorized first user A, indicated by A') 15 as a virtual artificial intelligence AI endpoint. The DA bot 15 is connected to the conference server 20 of the communication and collaboration platform 1 via an interface 16. As can be seen, an additional audio channel DA 17 is created between the authorized user A, determined to be authorized as outlined above, and the DA unit 8 and its media server 9, respectively.

Figure 7:
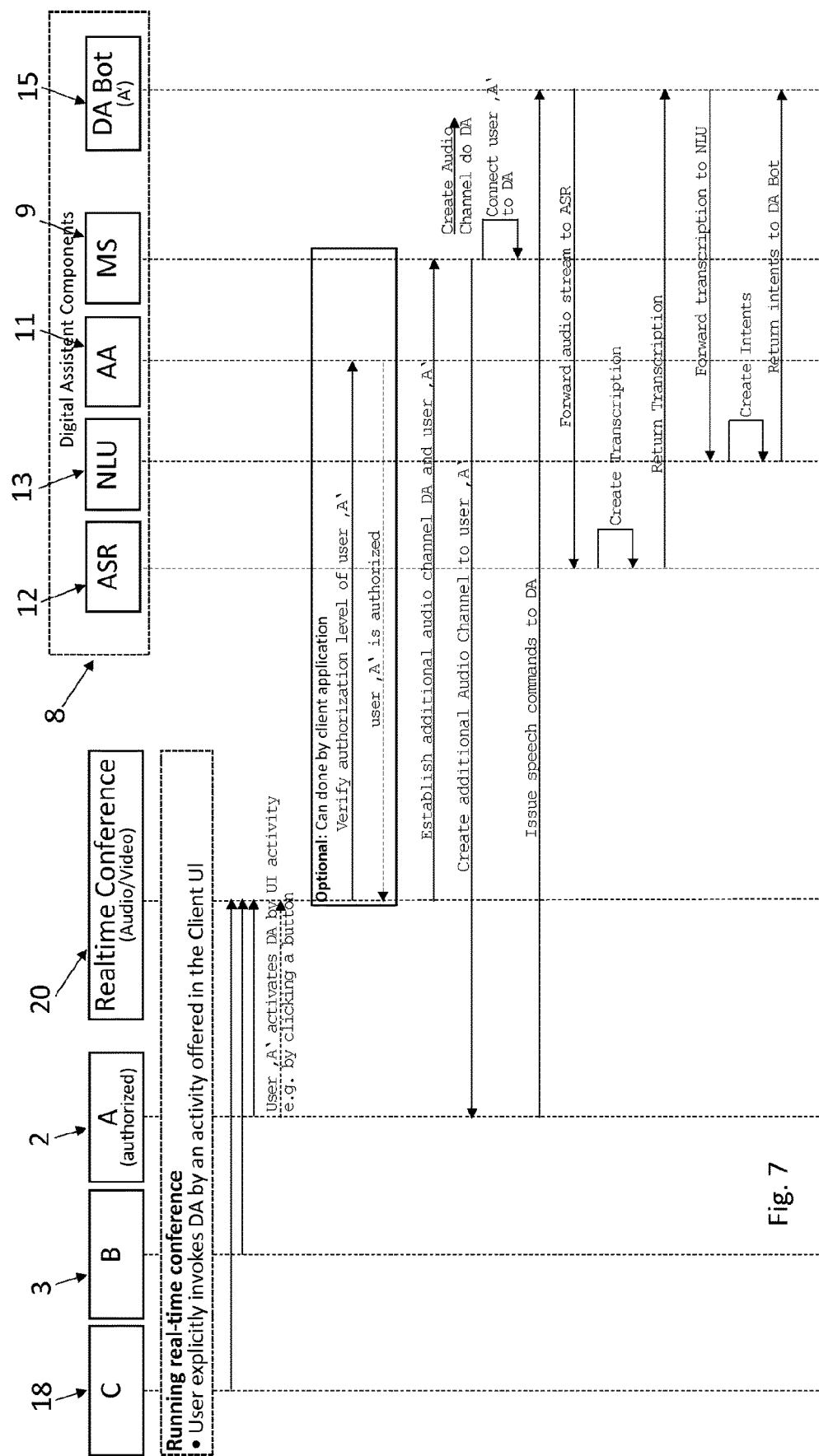
FIG. 7 shows a sequence diagram for a communication and collaboration platform according to the embodiment illustrated in FIG. 6.

FIG. 7 shows a sequence diagram for a communication and collaboration platform 1 according to the embodiment illustrated in FIG. 6 for a real-time conference scenario with three clients involved, and which uses indirect speaker identification, and the DA unit 8 and its DA bot 15, respectively, is triggered by a functionality in a client application.

Again, in the running real-time conference, there are three clients 2, 3, 18 involved, wherein the first client 2 is used by a first participant A who is authorized to access the DA unit 8 so as to provide commands for controlling the conversation. Here, the user has to explicitly invoke the DA unit 8 by an activity offered in the client user interface, e.g. the user has to manually click on a button or a switch or the like so as to active the DA unit 8. Upon activation, optionally the authorization of the user who clicked the button could be verified by the AA module 11. Otherwise, an additional audio channel DA 17 is established immediately between the user, here the first user A, and the media server 9 of the DA unit 8.

Subsequently, an audio channel is created within the DA unit 8 from the DA media server 9 to the DA bot 15 so as to connect the authorized user A with the DA bot 15. Once connected that way, the first user or participant A may issue speech commands (audio signals) via the additional audio channel DA 17 to the DA bot 15. The DA bot 15 forwards an audio stream to the ASR engine 12 which creates a transcription of the speech commands and returns the transcribed speech commands to the DA bot 15. The thus transcribed speech command/-s are then forwarded by the DA bot 15 to the NLU engine 13 which analyzes the transcription to identify the intention of the command given to the DA bot 15 and creates so-called intents from the transcribed speech command/-s. The intents are returned to the DA bot 15. If a command has been recognized, it is then executed. After the speech input has been processed as outlined above, the audio channel DA 17 between the first user or participant A and the media server 9 of the DA unit 8 is terminated. Alternatively, the additional audio channel 17 may be terminated after a predetermined timeout.

In the following, another mechanism is described which is applicable for all the embodiments described above which improves the quality of the speech recognition between the authorized user A and the DA unit 8. This solution makes use of a feature of the underlying real-time communication and collaboration platform, concretely to rout the audio-stream from an authorized person to a separate end-point either in parallel or before routing the audio-stream to a mixing unit. In particular, when the user is identified and authorized, only the audio stream from the authenticated user is sent to the ASR engine 12, which then starts transcribing and so forth, according to the procedures described above. This improves the audio quality and the therefore directly the recognition results, and moreover, eliminates background noises from other participants and also eliminates impairment from other users speaking over each other.

Another scenario which is not illustrated in the figures described above relates to the use of a DA unit 8 and its DA bot 15, respectively, in a 1-2-1 call between a first client 2 with user A and a second client 3 with user B, where both participants, namely, user A and user B are allowed to access the DA unit 8. Therefore, no speaker identification and the corresponding modules and engines are needed. This scenario, of course, could also be transferred to multiple party real-time conferences, as well.

Here, the DA unit 8 is part of the call like a (potentially invisible) additional participant. The utterances in the conversation are analyzed by means of the ASR engine 12. If a specific keyword is recognized, then the ASR engine 12 starts transcribing the following utterances. The transcription is passed to the NLU engine 13 which analyzes the transcription to identify the intention of the command given to the DA bot 15. In a next step, the commands are executed. Basically, this procedure corresponds to the ones described above, except for the steps relating to the identification of the speaker and his/her authorization.

Summarizing the above, the DA unit 8 and the DA application, respectively, provide the following features and technical functions:

- a Digital Assistant DA media server,
- de/encryption of SRTP voice packets from/to the controlling user (speech control packets),
- de/encoding of the packet (e.g. G.711, G.722, OPUS, AMR WB, . . . ) from/to the controlling user/client
- identification: Identify a speaker based on Active Speaker Notification ASN
- separation of audio channels: route the audio stream from an authorized person to the NLU engine 13 before or in parallel to passing the audio stream to the mixing unit in the media server so that background noises or utterances from other participants/users do not impair the speech recognition
- Digital Assistant DA—Automatic Speech Recognition ASR
- Speech Recognition engine which transcribes user utterance into text, recognizes keywords.
- Digital Assistant DA—authentication and authorization (with authentication for identifying a person based on Speaker Recognition (preferable wide band or full band codec) and authorization so as to ensure that user only is able to perform actions for which he/she is authorized for)
- Digital Assistant DA—Natural Language Understanding (NLU) which converts transcription provided by the Automatic Speech Recognition ASR into intents
- Digital Assistant DA—bot (robot) being the part of the DA application that is to be seen as virtual endpoint (or multiple virtual endpoints). The bot registers as user A' and monitors user A.
- Digital Assistant DA—TTS Text to Speech for notifications and feedback from the Digital Assistant back to the user A, Text-to-Speech transcription is needed, if such a feedback is being provided as voice.

In case the user authentication is performed via speaker recognition, higher quality voice codecs such as wideband codecs (AMR WB, G.722) or full band codecs (OPUS) are preferable. With respect to the authorization process, it is noted that once the user is authenticated, authorization checks are being done whether the user A's request is within the authorization range of what user A is allowed to request.

Further, it is noted that the audio DA channel is a resource assigned by the communication system. This allows for using regular call/conversation establishment procedures (e.g. JavaScript Object Notation JSON messages with Session Description Protocol SDP Offer/Answer procedures, or Session Initiation Protocol SIP/SDP) in the same way as channels would be established for regular audio, video sessions.

Also, a dedicated media server is preferable in order to separate MS resource for voice DA control and other media server usages such as for regular voice or video conferences. The audio DA channel may be always on or may be established on-demand. While user A talks to his/her DA via the audio DA channel, the other users which may be in the call or conference can continue talking without hearing what user A talks to his/her DA.

Further, it is noted that when the DA has notifications or confirmations for user A (such as successfully completion of a previous user A request), the client of user A ensures that user A's speaker/headset is through connected so that user A can hear the notification/confirmation provided by a Text-to-Speech (TTS) engine. According to an embodiment, user A may hear both, the current call/conference ongoing receive channels and the DA notification/confirmation provided by TTS blended in. Another option is that DA notifications are implemented as textual notifications/confirmation rather than speech-based notifications. In this case a DA data channel is needed instead of the DA Audio channel.

The embodiments described above are applicable to WebRTC systems but can also be applied to other communication and collaboration systems, such as SIP Systems or any other OTT system (Over the Top). Also, the embodiments described above are applicable to enterprise communication and collaboration systems, but can also be applied to carrier, service provider communication (Telco) systems. Also, the embodiments described above are applicable to voice controlled DA channel approaches, but the concept can also be applied to text-based DA channel approaches.

REFERENCE NUMERALS

1 communication and collaboration platform
2 first client 3 second client
5 call signaling channel
6 call signaling channel
7, 7', 7" communication channel
8 DA unit
9 media server of DA unit
11 AA module
12 ASR engine
13 NLU engine
14 TTS module
15 DA bot
16 API
17 voice recognition channel DA
18 third client
19 call signaling channel
20 conference server
21 ASN module
22 notification channel
24 SR

The invention claimed is:

1. A method for controlling a real-time communication, comprising:
   determining that a participant is authorized to access a digital assistant unit;
   in response to determining that the participant is authorized to access the digital assistant unit, activating the digital assistant unit based on the determination, the activating the digital assistant unit including establishing an audio channel between the participant and the digital assistant unit;
   upon activation of the digital assistant unit, transcribing an audio signal of the participant via the audio channel using a voice recognition procedure to generate a transcription;
   analyzing the transcription to identify a command included in the audio signal; and
   executing the command by the digital assistant unit.

2. The method according to claim 1, wherein the determination that a participant is authorized to access the digital assistant unit comprises receiving of log-in data from the participant.

3. The method according to claim 1, wherein the determination that a participant is authorized to access the digital assistant unit comprises verification of the participant.

4. The method according to claim 1, wherein the determination that a participant is authorized to access the digital assistant unit comprises detecting of a keyword from the audio signal received from the participant.

5. The method according to claim 1, wherein the determination that a participant is authorized to access the digital assistant unit comprises identifying a matching of an audio sample from the audio signal received from the participant with a pre-recorded voice sample.

6. The method according to claim 1, wherein the method further comprises identifying the participant as an active speaker based on the audio signal.

7. The method according to claim 1, wherein the method further comprises establishing an additional audio channel between the participant and the digital assistant unit.

8. A collaboration system, comprising:
   a processor; and
   a memory storing instructions for controlling a collaboration platform, the instructions, when executed by the processor, causes:
   determining that a participant is authorized to access a digital assistant unit;
   in response to determining that the participant is authorized to access the digital assistant unit, activating the digital assistant unit based on the determination, the activating the digital assistant unit including establishing an audio channel between the participant and the digital assistant unit;
   upon activation of the digital assistant unit, transcribing an audio signal of the participant via the audio channel using a voice recognition procedure to generate a transcription;
   analyzing the transcription to identify a command included in the audio signal; and
   executing the command by the digital assistant unit.

9. The collaboration system according to claim 8, wherein the determination that a participant is authorized to access the digital assistant unit comprises receiving of log-in data from the participant.

10. The collaboration system according to claim 8, wherein the determination that a participant is authorized to access the digital assistant unit comprises verification of the participant.

11. The collaboration system according to claim 8, wherein the determination that a participant is authorized to access the digital assistant unit comprises detecting of a keyword from the audio signal received from the participant.

12. The collaboration system according to claim 8, wherein the determination that a participant is authorized to access the digital assistant unit comprises identifying a matching of an audio sample from the audio signal received from the participant with a pre-recorded voice sample.

13. The collaboration system according to claim 8, wherein the instructions further comprise identifying the participant as an active speaker based on the audio signal.

14. The collaboration system according to claim 8, wherein the instructions further comprise establishing an additional audio channel between the participant and the digital assistant unit.

15. A non-transitory computer-readable medium storing instructions for controlling a collaboration platform, the instructions, when executed by a processor, cause:
   determining that a participant is authorized to access a digital assistant unit;
   in response to determining that the participant is authorized to access the digital assistant unit, activating the digital assistant unit based on the determination, the activating the digital assistant unit including establishing an audio channel between the participant and the digital assistant unit;
   upon activation of the digital assistant unit, transcribing an audio signal of the participant via the audio channel using a voice recognition procedure to generate a transcription;
   analyzing the transcription to identify a command included in the audio signal; and
   executing the command by the digital assistant unit.

16. The non-transitory computer-readable medium according to claim 15, wherein the determination that a participant is authorized to access the digital assistant unit comprises receiving of log-in data from the participant.

17. The non-transitory computer-readable medium according to claim 15, wherein the determination that a participant is authorized to access the digital assistant unit comprises verification of the participant.

18. The non-transitory computer-readable medium according to claim 15, wherein the determination that a participant is authorized to access the digital assistant unit comprises detecting of a keyword from the audio signal received from the participant.

19. The non-transitory computer-readable medium according to claim 15, wherein the determination that a participant is authorized to access the digital assistant unit comprises identifying a matching of an audio sample from the audio signal received from the participant with a pre-recorded voice sample.

20. The non-transitory computer-readable medium according to claim 15, wherein the instructions further comprise identifying the participant as an active speaker based on the audio signal.

\* \* \* \* \*